United States Patent

Wong-Chan et al.

[11] Patent Number: 5,842,026
[45] Date of Patent: Nov. 24, 1998

[54] INTERRUPT TRANSFER MANAGEMENT PROCESS AND SYSTEM FOR A MULTI-PROCESSOR ENVIRONMENT

[75] Inventors: Monica C. Wong-Chan, Concord, Mass.; Erik Hagersten, Palo Alto, Calif.

[73] Assignee: Sun Microsystems, Inc., Palo Alto, Calif.

[21] Appl. No.: 672,947

[22] Filed: Jul. 1, 1996

[51] Int. Cl.[6] .................................................. G06F 13/24
[52] U.S. Cl. .......................... 395/733; 395/293; 395/739; 395/737; 395/741; 370/242
[58] Field of Search .............................. 395/733, 200.47, 395/828, 741, 293, 739, 288, 681, 608; 370/242

[56] References Cited

U.S. PATENT DOCUMENTS

| | | | |
|---|---|---|---|
| 5,469,542 | 11/1995 | Foster et al. | 395/200.01 |
| 5,560,019 | 9/1996 | Narad | 395/733 |
| 5,630,059 | 5/1997 | Brady et al. | 395/200.01 |
| 5,630,077 | 5/1997 | Krein et al. | 395/293 |
| 5,633,857 | 5/1997 | Kim et al. | 370/242 |
| 5,664,200 | 9/1997 | Barlow et al. | 395/741 |

*Primary Examiner*—Meng-Ai T. An
*Assistant Examiner*—Eric S. Thlang
*Attorney, Agent, or Firm*—Homer L. Knearl; William J. Kubida; Holland & Hart LLP

[57] ABSTRACT

An interrupt mechanism handles an interrupt transaction between a source processor and a target processor on separate nodes in a multi-processor system. The nodes are connected to a network through node interface controls between the node and the network. The transaction begins by initiating the interrupt transaction at the source processor. The interrupt mechanism detects if the target processor is at a remote node on a system bus across the network, and if it is the mechanism sends an ignore signal to the source processor. Then the mechanism suspends the interrupt transaction at the source processor if it detects the target processor is at a remote node. The mechanism performs an ACK/NACK (acknowledge/non-acknowledge) operation at the target processor and returning an ACK signal or a NACK signal to the source processor across the network. This ACK/NACK signal wakes-up the source processor. The source processor sends interrupt data to the target processor if an ACK signal is received and aborts the interrupt transaction if a NACK signal is received.

9 Claims, 5 Drawing Sheets

INTERRUPT TRANSFER MANAGEMENT PROCESS AND SYSTEM FOR A MULTI-PROCESSOR ENVIRONMENT

FIELD OF THE INVENTION

This invention relates to interrupt mechanisms in multiple processor systems. More particularly, the invention relates to such an interrupt mechanism where the interrupt from one processor is sent to another processor on a different system bus.

DESCRIPTION OF RELATED ART

In multiple processor systems where the multiple processors are on the same system bus, interrupts between processors are exchanged with little or no delay. An interrupt from a first processor to a second processor is either acknowledged (ACK signal) or not acknowledged (NACK signal) by the second processor. Depending upon whether an ACK or a NACK is received by the first processor as status back from the second processor, the first processor proceeds to send the interrupt data or aborts the interrupt transaction.

When a multiple processors system has multiple system busses, the various system busses are connected through a global interconnect such as a bus or communication network. In this environment there can be a significant delay between the initiating processor sending out the interrupt address to begin the interrupt transaction and the initiating processor receiving the ACK or NACK status back from a target processor on another system bus.

If interrupt transaction requires too much time to complete, the processor initiating the interrupt transaction may either waste processing time handling the interrupt transaction, re-initiate the transaction, or abort the transaction.

SUMMARY OF THE INVENTION

In accordance with this invention, the above problem has been solved by performing an interrupt transaction in a multi-processor system between a source processor on a local system bus and a remote target processor on a remote system bus. The local system bus is connected through a local node interface control to a global interconnect, and the target system bus is connected through a remote node interface control to the global interconnect. The source processor initiates an interrupt request on the local system bus. The local node interface control captures the interrupt request and sends an ignore status to the source processor if the interrupt request is addressed to a target processor on the remote system bus. Also in this event, the local node interface forwards the interrupt request across the global interconnect to the remote node interface control. The source processor suspends its interrupt transaction process in response to the ignore status. The remote node interface control responds to the interrupt request to send the request to the target processor. The target processor responds to the interrupt request and returns an ACK (acknowledge) signal if the target processor is ready to process the interrupt transaction and returns a NACK (non-acknowledge) signal if the target processor is busy. The remote node interface control returns the ACK or NACK signal across the global interconnect to the local node interface control. The local node interface control responds to the ACK signal or NACK signal to send the ACK or NACK signal to the source processor. The source processor responds to the ACK signal or the NACK signal for waking-up the interrupt transaction process in the source processor and sends an interrupt data packet to the target processor in response to the ACK signal and aborts the interrupt transaction in response to a NACK signal.

As a feature of the invention, the local node interface control has a detect module responsive to the target address to detect the target processor is on a remote system bus. A send module at the local node interface responds to the detect module detecting the target processor is on a remote system bus and sends the ignore status to the source processor and forwards the interrupt address to the remote node interface control.

As another feature of the invention, the detect module responds to the target address to detect the target processor is on the local system bus. The target processor sends an ACK signal or a NACK signal over the local system bus to the source processor so that the interrupt transaction is handled on the local system bus.

In another feature of the invention, the local node interface control has a reissue module responsive to an ACK signal or a NACK signal from the target processor via the remote node interface control and reissues the interrupt request with the source address back to the source processor. An assert module in the local node interface control responds to the ACK signal from the target processor to assert an ACK signal onto the local system bus, and responds to the NACK signal from the target processor for asserting a NACK signal onto the local system bus.

The source processor has a wake-up module responsive to the interrupt request and wakes-up the interrupt transaction process in the source processor. A send module in the source processor responds to the ACK signal and sends the interrupt data packet to the target processor. An abort module in the source processor responds to the NACK signal and aborts the interrupt transaction.

In another feature of the invention the local node interface control responds to the interrupt data packet and sends the interrupt data packet to the remote node interface control along with an interrupt transaction completion message. The remote node interface control responds to the interrupt data packet and sends the interrupt data packet to the target processor. Also the remote node interface control responds to the interrupt transaction completion message and frees the resources of the remote node interface control.

In another feature of the invention the local node interface control responds to the NACK signal and sends an interrupt transaction completion message to the remote node interface control. The remote node interface control responds to the interrupt transaction completion message and frees the resources of the remote node interface control.

The great advantage and utility of the present invention is ability to handle interrupt transactions with a remote target processor without unduly burdening the source processor.

The foregoing and other features, utilities and advantages of the invention will be apparent from the following more particular description of a preferred embodiment of the invention as illustrated in the accompany drawings.

DETAILED DESCRIPTION OF PREFERRED EMBODIMENTS

Figure 1:
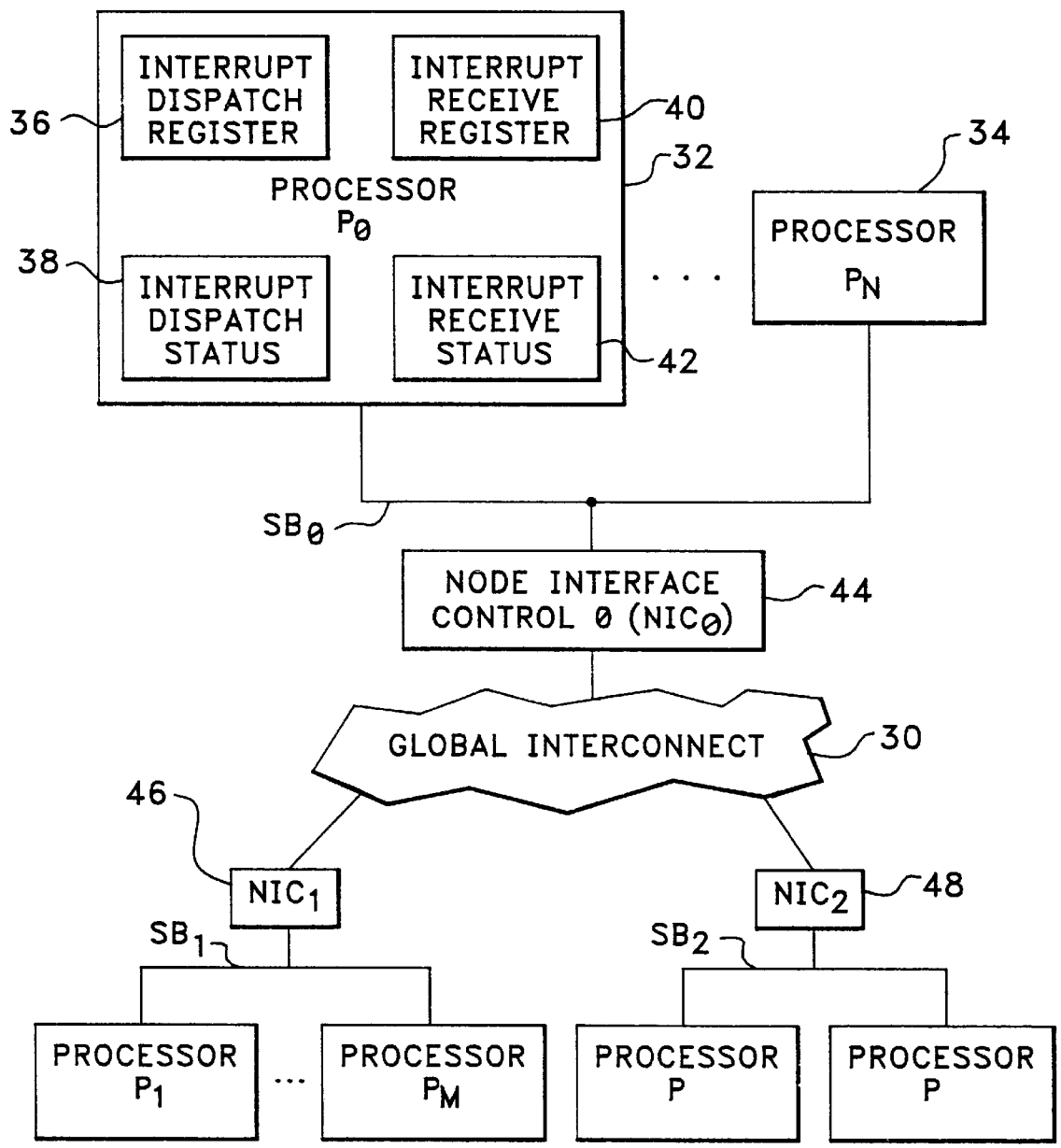
FIG. 1 shows the preferred embodiment of the interrupt mechanism for handling interrupt transactions on the same system bus or across an interconnect to another system bus.

The operating environment for the invention is illustrated in FIG. 1. FIG. 1 shows a multi-processor system having a global interconnect connecting three nodes in a multi-processor system having multiple processors at each node. The multiple processors at each node are connected by a system bus. For example processor 32 and processor 34 are interconnected by system bus 0 ($SB_0$). The system bus, in turn, is connected to the global interconnect 30 by node interface control 0. Global interconnect 30 could be as simple as a cross-bar switch or a bus or it could be a communication network. Each of the three nodes in FIG. 1 follows this same structure with multiple processors connected to a system bus, their system bus connected to a node interface control, and the node interface controls connected across the global interconnect.

Each of the processors in the multi-processor system has cache memory and shares main memory with other processors in the multi-processor system. For purposes of this invention, the registers used in each processor, as shown for processor 32 ($P_0$), are an interrupt dispatch register 36, interrupt dispatch status register 38, interrupt receive register 40 and an interrupt receive status register 42. These registers are shown only for processor 32 (Processor $P_0$) but are present in all of the processors in the multi-processor system of FIG. 1. The node interface control devices 44, 46 and 48 are all intelligent devices fabricated from ASICs (Application Specific Integrated Circuits).

Figure 2:
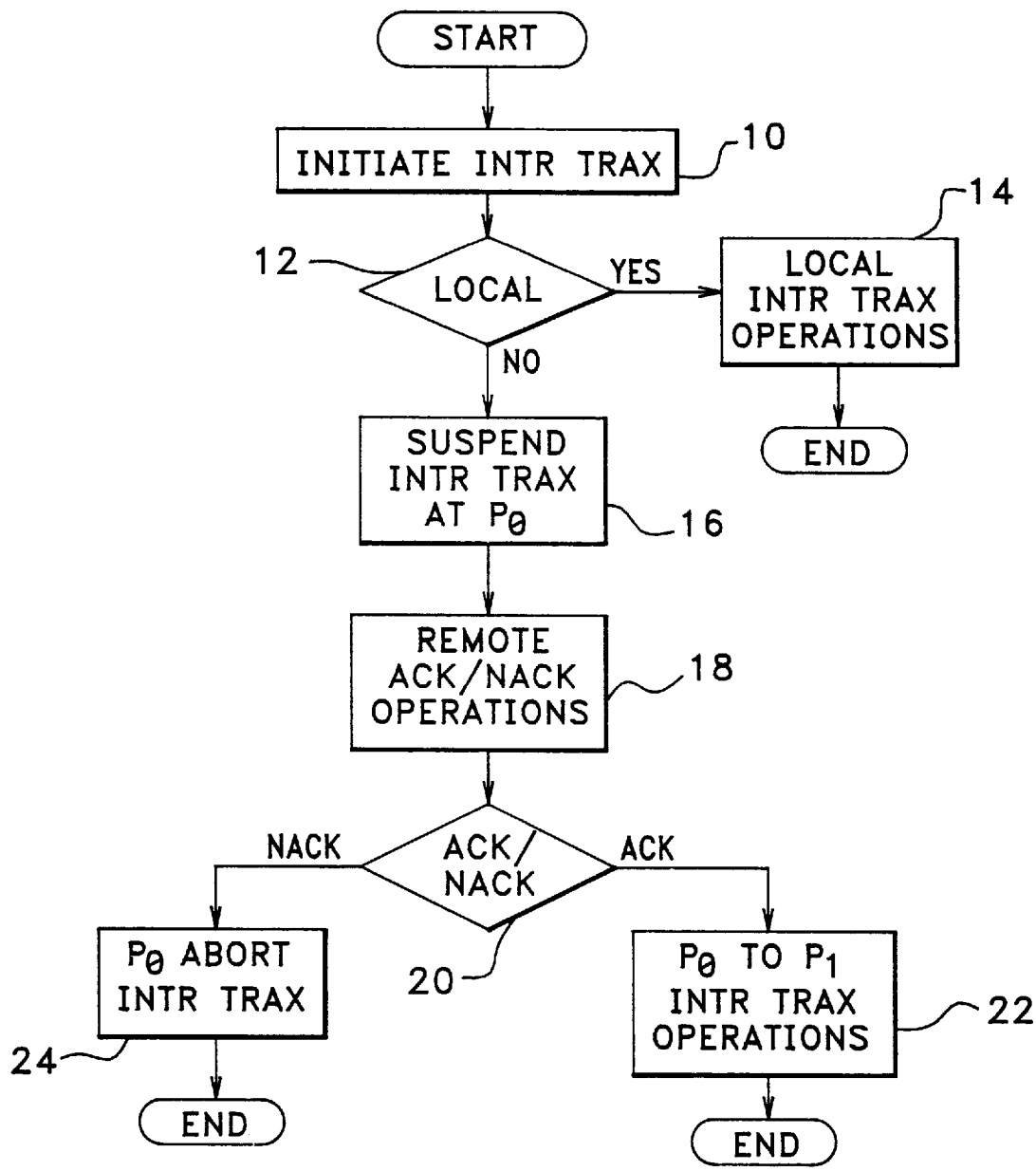
FIG. 2 illustrates an example of the operating environment for the present invention.

FIG. 2 illustrates the preferred embodiment of the invention where an interrupt transaction initiated by a first processor is handled either as a local interrupt transaction on the same system bus, or as a remote interrupt transaction through a global interconnect to a target processor on a second system bus. The operations begin by the source processor $P_0$ initiating the interrupt transaction (INTR TRAX) in operation 10. With the transaction on the local system bus, operation 12 detects whether the interrupt transaction is for a processor on the local system bus or for a processor on a remote system bus. If the interrupt transaction is for a local processor, the operation flow branches "Yes" to the local interrupt transaction operations 14. If the interrupt transaction is for a second processor across a communication network to a second system bus, the operation flow branches "No" from decision 12 to suspend operation 16. Suspend operation 16 suspends the interrupt transaction at $P_0$, the initiating processor for the interrupt transaction. While the transaction is suspended at initiating processor $P_0$, remote acknowledge/no-acknowledge (NACK) operations 18 are performed. These remote ACK/NACK operations involve communicating an interrupt request to a target processor through the communication network and a second system bus to which the target processor is attached. The target processor will return an ACK/NACK status signal depending on whether it is busy.

Operation 20 detects whether the return status is ACK or NACK. If the target processor acknowledges the interrupt request, then the operation flow branches to operation 22 where the initiating processor $P_0$ sends to the target processor $P_1$ on the second bus the interrupt transaction data. Operations 22 complete the transmission of interrupt data between initiating processor $P_0$ and target processor $P_1$.

If the decision operation 20 detects that the status return from the target processor is NACK, then the operation flow branches to abort operation 24. In the abort operation 24, the initiating processor aborts the interrupt transaction.

Figure 3A:
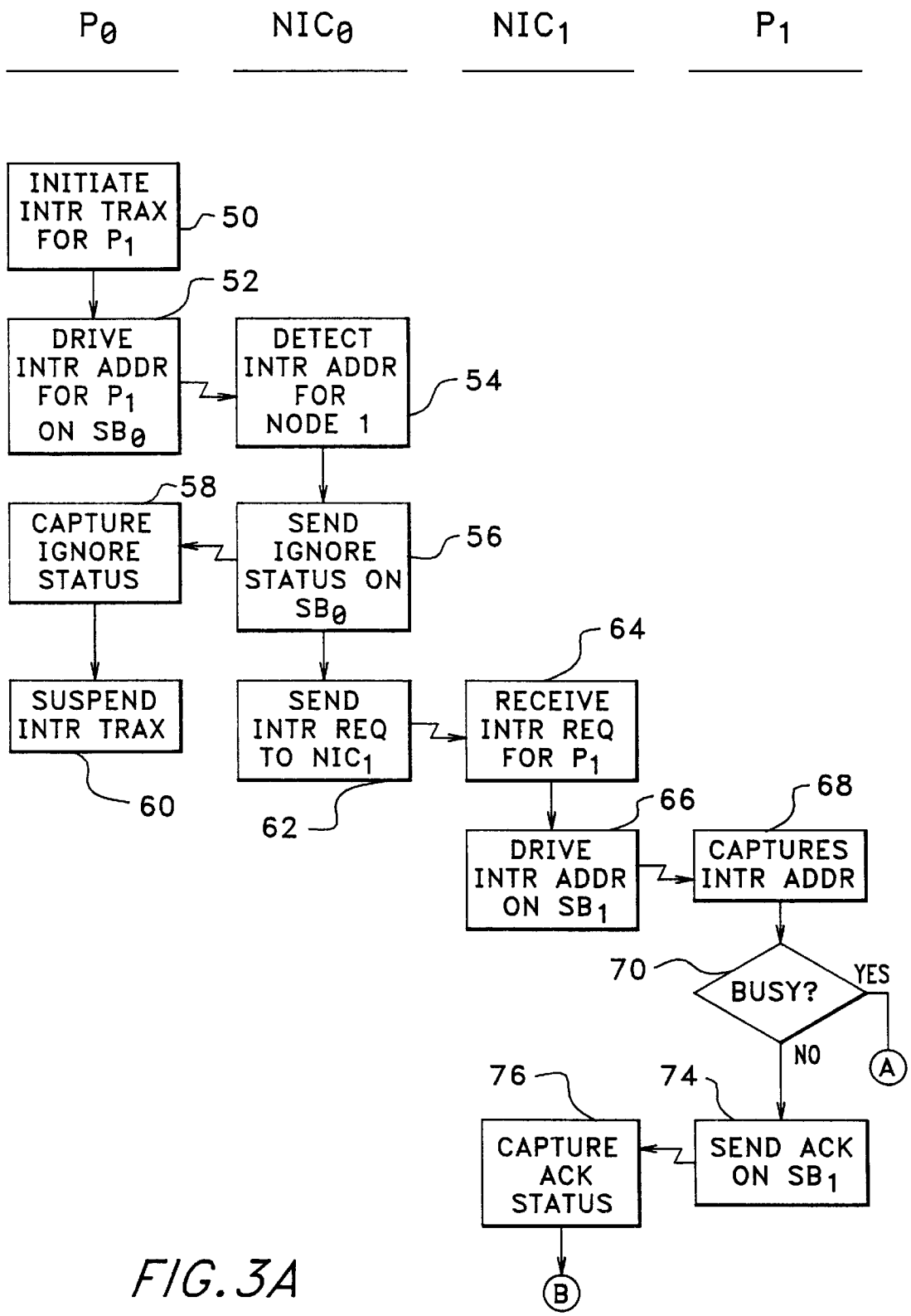
FIG. 3, composed of FIGS. 3A, 3B and 3C, illustrates the operations performed by a source processor, a first node interface control, a second node interface control and a target processor to accomplish the interrupt transaction across a global interconnect in accordance with a preferred embodiment of the invention.
Figure 3B:
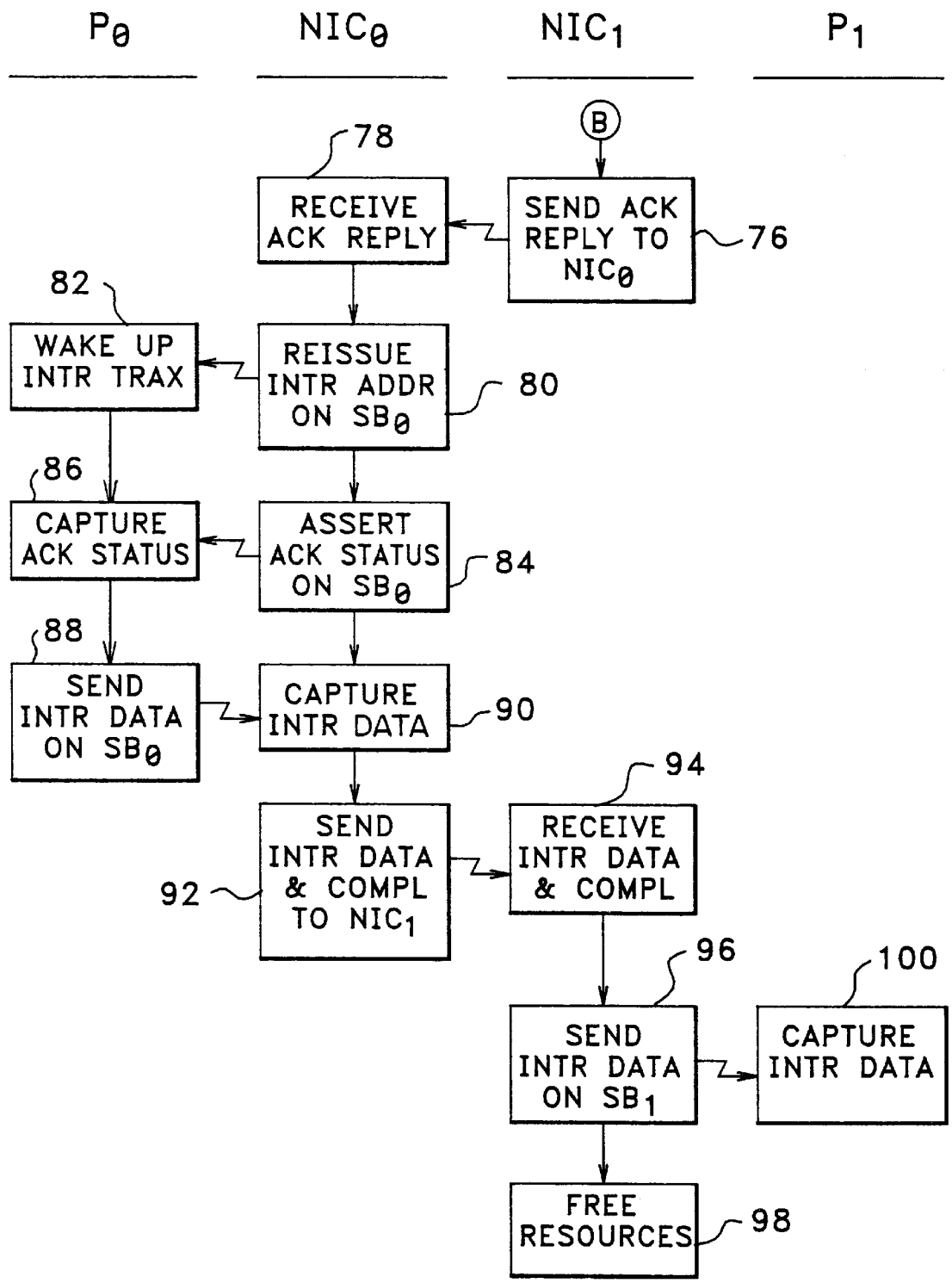
Figure 3C:
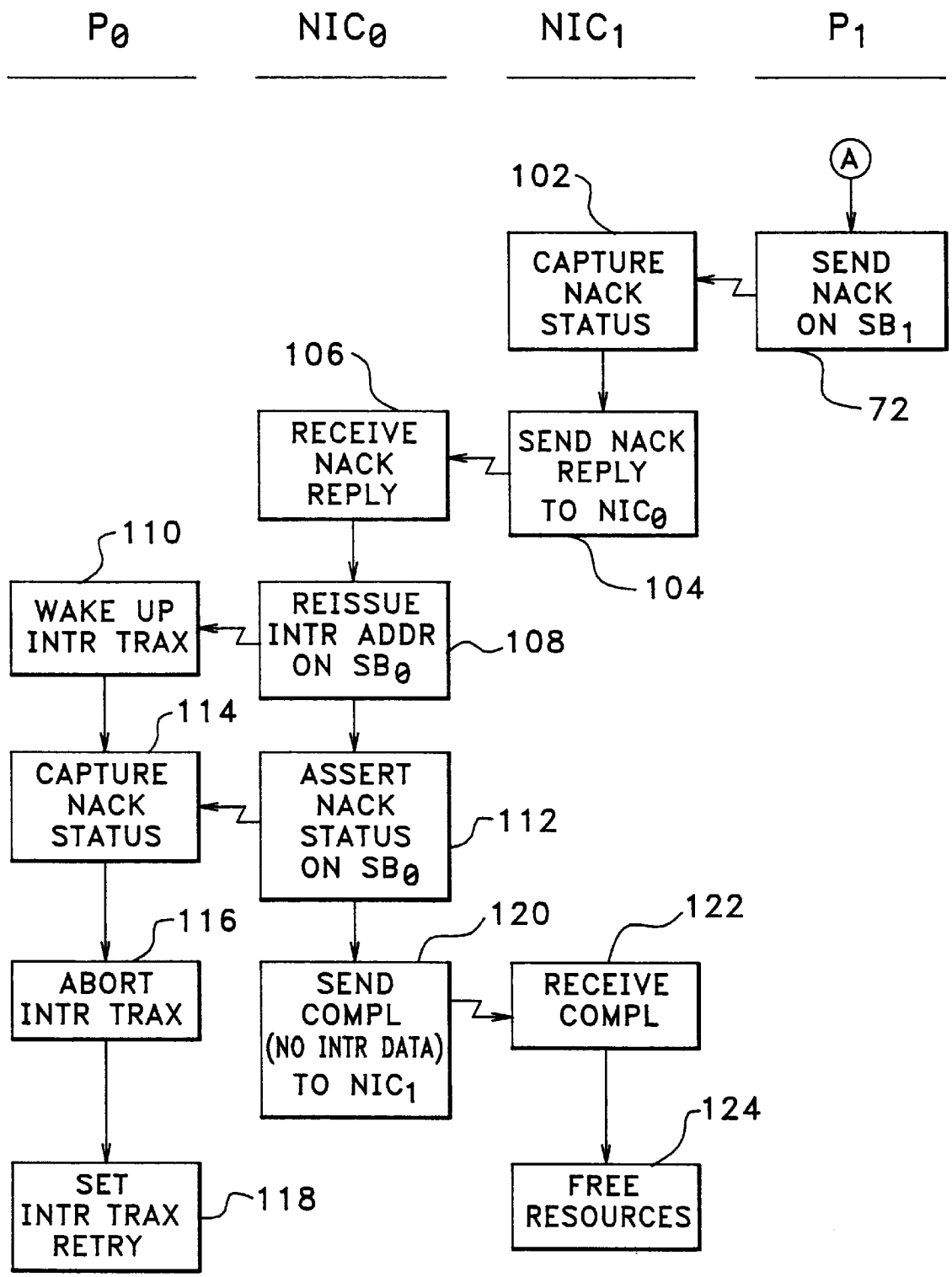

FIG. 3, composed of FIGS. 3A, 3B and 3C, illustrates the operations performed by an initiating processor, $P_0$, a target processor $P_1$, a node interface control 0 at the node containing the initiating processor and a node interface control 1 at the node containing the target processor. FIG. 3 is organized in four columns indicating the operations performed at the initiating processor $P_0$, the node interface control 0 on the same system bus with the initiating processor, the node control interface control 1 on the same system bus with the target processor, and the target processor 1.

In FIG. 3A the operation begins at the initiating processor $P_0$ where operation 50 initiates an interrupt transaction (INTR TRAX) addressed to target processor $P_1$. Operation 52 at $P_0$ drives the interrupt address (INTR ADDR) as dispatched from the interrupt dispatch register on to system bus 0 ($SB_0$). Node interface control 0 ($NIC_0$) in operation 54 then captures the interrupt address (INTR ADDR). Operation 54 also detects that this interrupt address is for a processor $P_1$ located at node 1.

In response to the detection of the interrupt address for another node, operation 56 sends an IGNORE status out on the $SB_0$. Processor $P_0$ in operation 58 captures the IGNORE status as the reply to $P_0$ driving out the interrupt address. In response to the IGNORE status, $P_0$ suspends the interrupt transaction in operation 60. Meanwhile the node interface control 0 ($NIC_0$) in operation 62 sends an interrupt request to $NIC_1$. As shown in FIG. 1, $NIC_1$ is at node 1, which contains multiple processors including the target processor $P_1$ interconnected by a system bus $SB_1$.

At $NIC_1$, operation 64 receives the interrupt request for target processor $P_1$. $NIC_1$ then drives the interrupt address contained in the interrupt request on system bus $SB_1$ during operation 66.

Target processor $P_1$ captures the interrupt address from the system bus and identifies itself as the recipient of the interrupt transaction. Decision operation 70 at target processor $P_1$ tests whether the processor is BUSY, i.e handling an interrupt transaction from another processor. If the processor is BUSY, the operation flow branches from decision operation 70 to send operation 72 in FIG. 3C. If the target processor is NOT BUSY, then the operation flow branches to send operation 74. Operation 74 sends an acknowledge (ACK) out on $SB_1$. The node interface control 1 captures this acknowledge status in its operation 76. The remainder of the operation flow in response to an ACK status is shown in FIG. 3B.

After $NIC_1$ captures the ACK status from the target processor, operation 76 in FIG. 3B sends an ACK reply to $NIC_0$. At $NIC_0$, operation 78 receives the ACK reply. In response to the ACK reply, $NIC_0$ in operation 80 reissues the interrupt address on $SB_0$. At the initiating processor $P_0$, operation 82 captures the interrupt address and wakes up the interrupt transaction process in processor $P_0$.

After $NIC_0$ reissues the interrupt address, operation 84 at $NIC_0$ asserts the ACK status for the target processor on $SB_0$. Initiating processor $P_0$ being awakened in operation 82, captures the ACK status in operation 86. Operation 88 in the initiating processor then sends the interrupt data packet out on system bus $SB_0$.

$NIC_0$ at operation 90 captures the interrupt data packet. Operation 92 then sends the interrupt data packet along with a completion message to $NIC_1$.

At $NIC_1$ operation 94 receives the interrupt data packet and the completion message. $NIC_1$ in operation 96 sends the interrupt data out on $SB_1$. After the interrupt data is sent out on $SB_1$, operation 98 frees the resources at $NIC_1$ to handle the next transaction.

At the target processor $P_1$ operation 100 captures the interrupt data put on system bus $SB_1$ by $NIC_1$. After the interrupt data packet is captured by the target processor $P_1$, the interrupt transaction initiated by initiating processor $P_0$ is complete.

FIG. 3C illustrates the operation flow in the event that the target processor $P_1$ is BUSY, and operation 72 in FIG. 3C has sent a NACK status out on $SB_1$. Operation 102 in $NIC_1$ captures the NACK status on system bus $SB_1$. In response to the NACK status, operation 104 sends a NACK reply to $NIC_0$.

Operation 106 in $NIC_0$ receives the NACK reply and initiates operation 108. Operation 108 reissues the interrupt address on $SB_0$. At the initiating processor $P_0$, operation 110 captures the interrupt address and in response thereto wakes up the interrupt transaction processing at the initiating processor $P_0$. $NIC_0$, after reissuing the interrupt address, in operation 112 asserts the NACK status on $SB_0$. This is the NACK status that originated from target processor $P_1$. Initiating processor $P_0$ in operation 114 captures this NACK status. Then processor $P_0$ aborts the interrupt transaction in operation 116. After the interrupt transaction is aborted, initiating processor $P_0$ sets an interrupt transaction retry to initiate the interrupt transaction at a later time.

After sending the NACK status, $NIC_0$ in operation 120 sends a completion message to $NIC_1$. Operation 120 in effect generates the response after $NIC_0$ has asserted the NACK status on $SB_0$. This response is simply a completion message. There is no interrupt data packet sent by operation 120.

At $NIC_1$ the completion message is received by operation 122. $NIC_1$, in response to the completion message, initiates operation 124. Operation 124 frees all of the resources allotted to the interrupt transaction in $NIC_1$. $NIC_1$ is then ready to process the next interrupt transaction.

While the invention has been particularly shown and described with reference to a preferred embodiment thereof, it will be understood by those skilled in the art that various other changes in the form and details may be made therein without departing from the spirit and scope of the invention.

We claim:

1. A method for handling an interrupt transaction between a source processor and a target processor on separate nodes in a multi-processor system, the nodes being connected to a network through network interface controls between the node and the network, said method comprising the computer implemented steps of:

initiating the interrupt transaction at the source processor by sending an interrupt address identifying the target processor as the target of the interrupt transaction;

detecting the target processor is at a remote node on a system bus across the network;

suspending the interrupt transaction at the source processor if said detecting step detects the target processor is at a remote node, said step of suspending comprising sending an ignore signal to the source processor in response to said detecting step detecting the target processor is at a remote node, and capturing the ignore signal at the source processor and in response thereto suspending the interrupt transaction at the source processor;

forwarding an interrupt request to a target processor across the global interconnect to the remote node interface control in performing an ACK/NACK (acknowledge/non-acknowledge) operation at the target processor and returning an ACK signal or a NACK signal to the source processor across the network;

waking up the source processor when an ACK signal or NACK signal from the target processor is received and captured by the source processor from the target processor and capturing the ACK signal or NACK signal at the source processor and in response thereto waking up the interrupt transaction at the source processor; and sending the interrupt data from the source processor to the target processor if an ACK signal is received and aborting the interrupt transaction if a NACK signal is received.

2. The method of claim 1 further comprising the computer implemented steps of:

detecting the target processor is at a local node on the same system bus as the source processor;

performing a local interrupt transaction if said detecting step detects the target processor is at a local node.

3. Interrupt mechanism apparatus for performing an interrupt transaction in a multi-processor system between a source processor on a local system bus and a remote target processor on a remote system bus, the local system bus being connected through a local node interface control to a global interconnect and the target system bus being connected through a remote node interface control to the global interconnect, said interrupt mechanism apparatus comprising:

said source processor initiating an interrupt request on the local system bus, the interrupt request including a target address identifying the target processor;

said local node interface control having a detect module responsive to the target address and detecting the target processor is on the local system bus, said local node interface control detecting the target processor is on a remote system bus and capturing the interrupt request, said local node interface control further having a send module responsive to the detect module detecting the target processor is on a remote system bus and sending an ignore status to said source processor if the interrupt request is addressed to a target processor on the remote system bus and forwarding the interrupt request across the global interconnect to the remote node interface control;

said source processor suspending the interrupt transaction of the source processor in response to the ignore status;

said remote node interface control responsive to the interrupt request to send the request to the target processor;

said target processor responsive to the interrupt request returning an ACK (acknowledge) signal over the local system bus if the target processor is ready to process the interrupt transaction and returning a NACK (non-acknowledge) signal over the local system bus if the target processor is busy;

said remote node interface control returning the ACK or NACK signal across the global interconnect to the local node interface control;

said local node interface control responsive to the ACK signal or NACK signal to send the ACK or NACK signal to the source processor;

said source processor responsive to the ACK signal or the NACK signal for waking-up the interrupt transaction process and sending an interrupt data packet to the target processor in response to the ACK signal and aborting the interrupt transaction in response to a NACK signal.

4. Interrupt mechanism apparatus for performing an interrupt transaction in a multi-processor system between a source processor on a local system bus and a remote target processor on a remote system bus, the local system bus being connected through a local node interface control to a global interconnect and the target system bus being connected through a remote node interface control to the global interconnect, said interrupt mechanism apparatus comprising:

said source processor initiating an interrupt request on the local system bus;

said local node interface control capturing the interrupt request and sending an ignore status to said source processor if the interrupt request is addressed to a target processor on the remote system bus and forwarding the interrupt request across the global interconnect to the remote node interface control;

said source processor suspending its interrupt transaction process in response to the ignore status;

said remote node interface control responsive to the interrupt request to send the request to the target processor;

said target processor responsive to the interrupt request returning an ACK (acknowledge) signal if the target processor is ready to process the interrupt transaction and returning a NACK (non-acknowledge) signal if the target processor is busy;

said remote node interface control returning the ACK or NACK signal across the global interconnect to the local node interface control, said local node interface control responsive to the ACK signal or NACK signal to send the ACK or NACK signal to the source processor;

said source processor responsive to the ACK signal or the NACK signal for waking-up the interrupt transaction process and sending an interrupt data packet to the target processor in response to the ACK signal and aborting the interrupt transaction in response to a NACK signal;

said interrupt request includes a target address identifying the target processor; and said local node interface control comprises:

a detect module responsive to the target address and detecting the target processor is on a remote system bus;

a send module responsive to the detect module detecting the target processor is on a remote system bus and sending an ignore status to the source processor and forwarding the interrupt address to the remote note interface control;

reissue module responsive to an ACK signal or a NACK signal from the target processor via the remote node interface control reissuing the interrupt request with the source address back to the source processor;

an assert module responsive to the ACK signal from the target processor for asserting an ACK signal onto the local system bus; and said assert module responsive to the NACK signal from the target processor for asserting a NACK signal onto the local system bus.

5. The apparatus of claim 4 wherein said source processor comprises:

a wake-up module responsive to the interrupt request and waking-up the interrupt transaction process in said source processor;

a send module responsive to the ACK signal for sending the interrupt data packet to the target processor;

an abort module responsive to the NACK signal aborting the interrupt transaction.

6. The apparatus of claim 5 wherein:

said local node interface control responsive to the interrupt data packet and sending the interrupt data packet to the remote node interface control along with an interrupt transaction completion message.

7. The apparatus of claim 6 wherein:

said remote node interface control responsive to the interrupt data packet and sending the interrupt data packet to the target processor; and said remote node interface control responsive to the interrupt transaction completion message and freeing the resources of the remote node interface control.

8. The apparatus of claim 4 wherein:

said local node interface control responsive to the NACK signal and sending an interrupt transaction completion message to the remote node interface control.

9. The apparatus of claim 8 wherein:

said remote node interface control responsive to the interrupt transaction completion message and freeing the resources of the remote node interface control.

* * * * *